July 5, 1955  F. J. MARTINI  2,712,419
SPINNING TYPE FISHING REEL

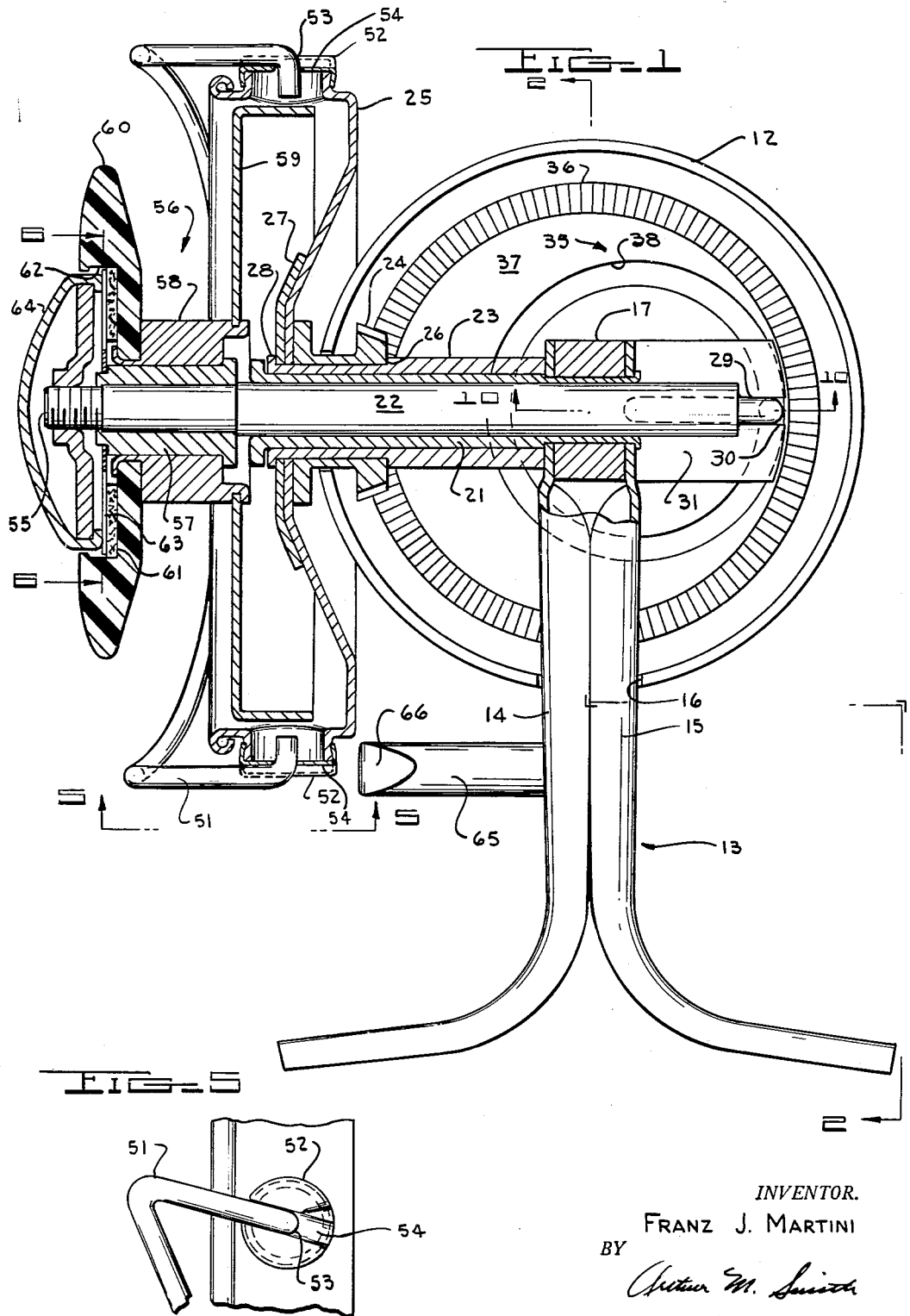

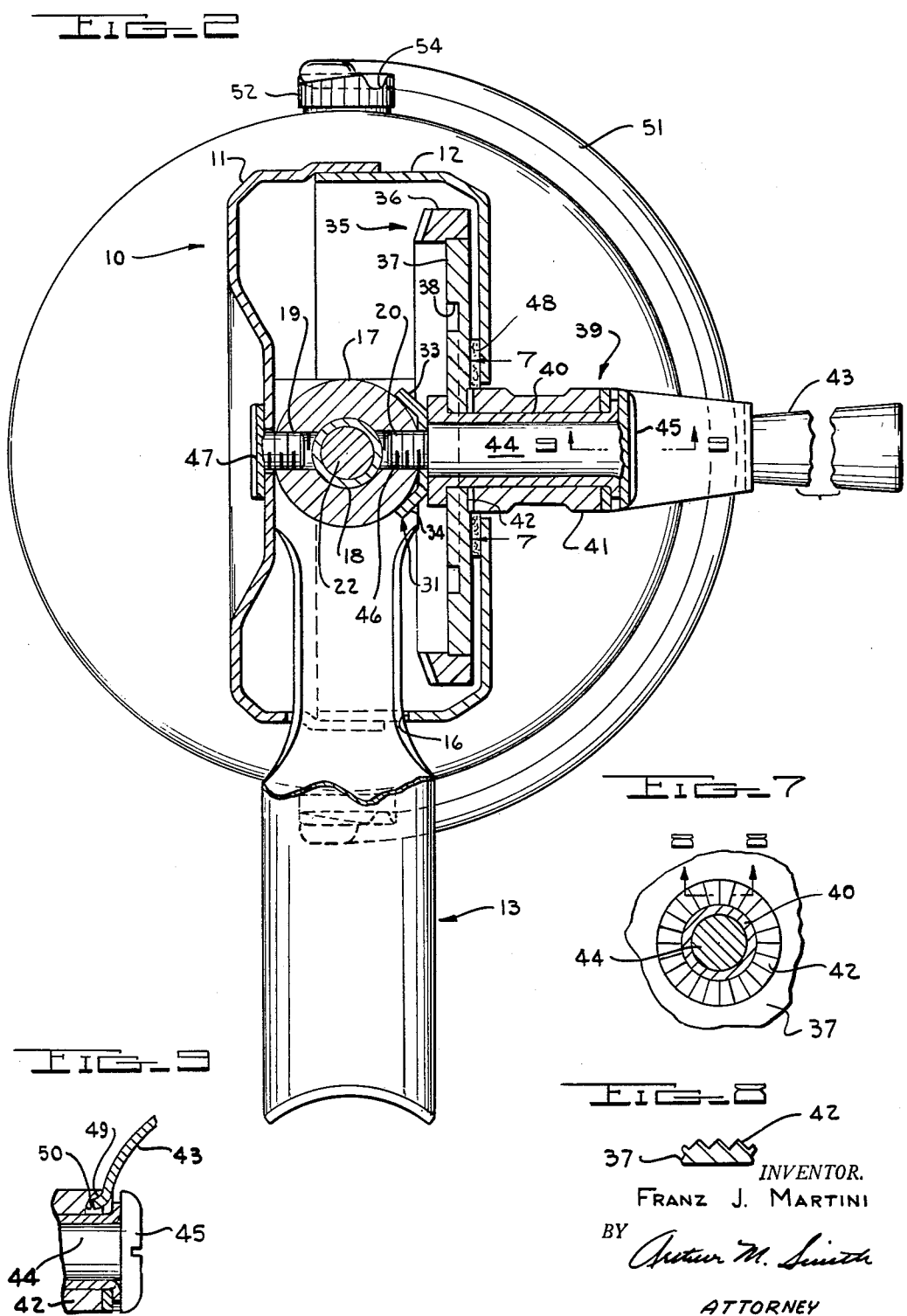

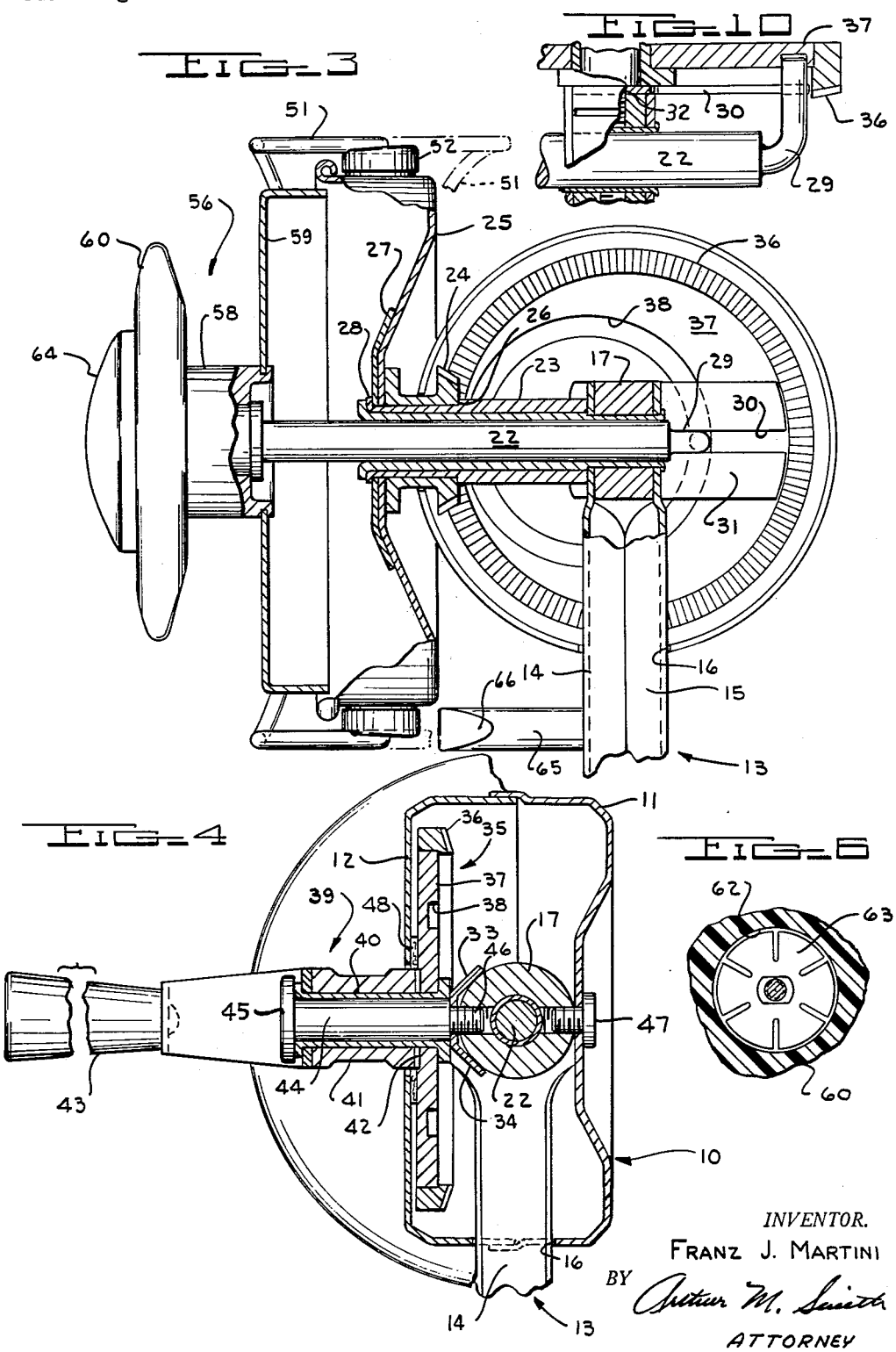

Filed Aug. 30, 1950  4 Sheets-Sheet 4

INVENTOR.
FRANZ J. MARTINI
BY
ATTORNEY

United States Patent Office 2,712,419
Patented July 5, 1955

2,712,419

SPINNING TYPE FISHING REEL

Franz J. Martini, Detroit, Mich.

Application August 30, 1950, Serial No. 182,249

4 Claims. (Cl. 242—84.4)

The present invention relates to a spinning type fishing reel wherein a non-rotating spool is mounted on a reciprocating shaft and a flier carrying a line-winding member rotates around the spool during its reciprocation. The present application is a continuation-in-part of my co-pending application, Serial No. 50,200, filed September 20, 1948, which issued into Patent No. 2,546,465 on March 27, 1951.

Spinning reels differ from conventional casting reels in that the spool is non-rotatable and reciprocates about a longitudinal axis which extends substantially parallel to the longitudinal axis of the casting rod. During the casting operation, the line is stripped or spun off the end of the non-rotatable spool. A flier concentric with the spool rotates around the spool, and carries a line-winding member which engages the line and guides it around the spool. The line-winding member is adapted to be disengaged during the casting operation.

Many spinning type fishing reels are characterized by a complicated mechanism for combining the reciprocation of the spool with the rotation of the flier. Due to the complications of the parts and the machining operations required, these reels have been relatively expensive.

Therefore, it is a principal object of the present invention to provide a spinning type fishing reel which is composed of relatively few standard stock parts and stampings to produce a reel which is relatively easy and inexpensive to manufacture.

It is a further object of the present invention to provide such a spinning type fishing reel wherein the reel assembly may be altered to provide either right hand operation or left hand operation by quickly and easily interchanging a small number of standard parts.

It is a further object of the present invention to provide a spinning type fishing reel which is relatively light in weight and which is adapted to form a part of a well-balanced casting unit when mounted on a lightweight casting rod.

It is a further object of the present invention to provide a simple and efficient mechanism for reciprocating the spool of the reel, while simultaneously rotating the flier.

It is another object of the present invention to provide a spinning type fishing reel wherein a simple and efficient adjustable device is provided to permit relative movement between the spool and crank when the pulling force on the line exceeds a predetermined drag or braking force.

It is another object of the present invention to provide a spinning type fishing reel embodying a line engaging bail which will automatically engage the line when the crank is operated, and which is easily and quickly placed in the inoperative position when preparing to cast.

Other objects of this invention will appear in the following description and appended claims, reference being had to the accompanying drawings forming a part of this specification wherein like reference characters designate corresponding parts in the several views.

In the drawings:

Fig. 1 is a sectional side elevation of a spinning type fishing reel embodying the present invention with the spool in the retracted position, and showing the operative parts in position for left hand winding and right hand casting;

Fig. 2 is a sectional rear elevation taken along the line 2—2 in the direction of the arrows, Fig. 1;

Fig. 3 is a sectional side elevation of the reel shown in Fig. 1, with the spool in the extended position;

Fig. 4 is a sectional elevation of the housing and its component parts with the operative parts in position for right hand winding and left hand casting;

Fig. 5 is a fragmentary view of a portion of the flier and bail showing the manner of attachment of the said bail to the flier, and taken along the line 5—5 in the direction of the arrows, Fig. 1;

Fig. 6 is a sectional view showing the spring clutch disc of the present invention and taken along the line 6—6 in the direction of the arrows, Fig. 1;

Fig. 7 is a fragmentary side elevation of the gear-crank unit taken along the line 7—7 in the direction of the arrows, Fig. 2;

Fig. 8 is a fragmentary section showing the serrations in the drive gear hub, and taken along the line 8—8 in the direction of the arrows, Fig. 7;

Fig. 9 is a fragmentary section showing the positive engagement of the crank with the drive gear hub and taken along the line 9—9 in the direction of the arrows, Fig. 2;

Fig. 10 is a fragmentary section taken along the line 10—10 in the direction of the arrows, Fig. 1, and particularly showing the construction of the cam follower;

Figure 11:
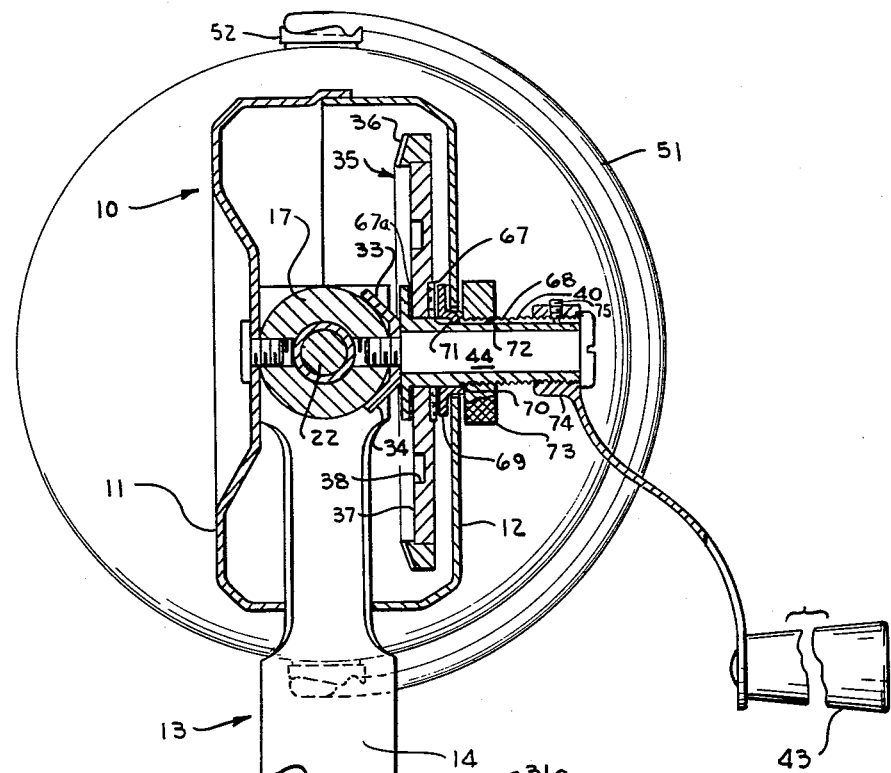
Fig. 11 is a rear sectional elevation of a modification of the present invention, disclosing a slip clutch or brake disposed between the crank and the drive gear.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the numeral 10 (Fig. 2) indicates the housing which is formed of two complemental lightweight metal stampings 11 and 12, each forming one half of the completed housing.

A reel post 13 (Fig. 1) formed of a pair of complemental stampings 14 and 15 extends upward into the housing 10 through an opening 16 therein. Disposed between the stampings 14 and 15 within the reel housing 10 is a spacer 17 (Fig. 1). It will be noted (Fig. 2) that the spacer 17 has a central hole 18 along its longitudinal axis and transverse screw-threaded holes 19 and 20 on each side extending transversely into the central longitudinal hole 18. Referring to Fig. 1, a sleeve 21 extends through the longitudinal hole 18 (Fig. 2) in the spacer 17 and holes in the post 13 and provides a bearing surface for the central shaft 22 which is adapted for reciprocating movement therein. Disposed concentrically around the sleeve 21 is another sleeve 23 onto which is pressed a bevel gear 24. The bevel gear 24 is rigidly affixed to a cup-shaped flier 25 by the shoulder 26 on the sleeve 23, the retainer 27, and the flange 28 on the end of the sleeve 23. Thus, when the bevel gear 24 is rotated, the flier 25 will also rotate.

A cam follower 29 (Figs. 1 and 10) is formed on the rearward end of the shaft 22 and extends at substantially a right angle thereto. The cam follower 29 is disposed within the groove 30 of a plate 31 (Fig. 1). The plate 31 also includes the hole 32 (Fig. 10) and the inturned locating ears 33 and 34 (Fig. 2).

A main drive gear 35 (Figs. 1 and 2) consists of a coined peripheral gear portion 36 into which is pressed an aluminum disc 37 having therein an eccentric cam groove 38. Referring to Fig. 1 of the drawing, it will be seen that as the main drive gear 35 is rotated, the shaft 22 will reciprocate within the sleeve 21. The gear portion 36 engages the bevel gear 24 and as the main drive gear 35 is rotated, the bevel gear 24 and flier 25 which is affixed thereto, are also rotated. Thus, when the main drive gear 35 is rotated, the flier 25 is rotated and the drive shaft 22 is simultaneously reciprocated.

Referring to Fig. 2, an integral drive gear crank unit is designated by the numeral 39. This unit is composed of the drive gear 35 which is disposed on one end of the sleeve 40, the hub 41 which is disposed on the sleeve 40 and which is provided with serrated portions 42 (Figs. 7 and 8) to provide a secure connection with the drive gear 35, and the handle portion 43 which is affixed to the other end of the sleeve 40.

The drive gear crank unit 39 is secured in place (Fig. 2) by inserting the pin 44, which has the head 45 on one end and the screw-threaded portion 46 on the other end, through the sleeve 40 and the plate 31 (Fig. 1), and engaging the screw-threaded portion 46 with transverse hole 20 in the spacer 17. It will be noted in Fig. 2 that the stamping 11 is secured in place on the opposite side of the spacer 17 by a cap screw 47. A felt disc 48 is disposed between the main drive gear 35 and the sidewall of the housing 12 to prevent dirt and moisture from getting into the housing. It will also be noted that the stampings 11 and 12 overlap in forming the housing 10 so that this joint also keeps out dirt and moisture.

Fig. 9 shows an outturned portion 49 of the crank 43 which is disposed in a slot 50 in the hub 41 to provide a positive connection between the crank and the hub.

A semi-circular removable bail 51 (Figs. 1 and 2) is attached to diametrically opposed points on the flier 25. Caps 52 are fitted onto bosses on the flier 25 and are provided with central holes 53. Each cap is also provided with a diametrically extending groove 54 to selectively seat the bail in positions 180 degrees apart (Fig. 5). The portion of groove 54 to the left of hole 53 in Figure 2 provides a shoulder for seating bail 51 in line-engaging position. A portion of each cap is cut away to form an inclined cam face, the purpose of which will appear hereinafter.

Referring to Fig. 1, the forward end of the shaft 22 is screw-threaded at 55. Disposed over the forward portion of the shaft 22 is the spool assembly 56 which comprises the bearing 57, the spool core 58 disposed around the bearing 57, the rearward spool cap 59 affixed to the spool core 58, and the forward spool cap 60 affixed to the core 58. The spool assembly 56 is placed over the forward portion of the shaft 22 and a felt friction disc 61 is placed within the depression 62 formed in the face of the forward spool cap 60. A metallic spring disc 63 (Figs. 1 and 6) is then placed against the friction disc 61, and a cap nut 64 is screw-threaded onto the end 55 of the shaft 22. The inner portions of the cap nut 64 bear against the metal disc 63, which in turn, bears against the felt disc 61, and seats on bearing 57 to exert adjustable pressure against the forward spool 60. Thus, the spool may be adjusted to rotate when sufficient force is exerted on the line which is attached to the spool.

A cam finger 65 is disposed on the reel post 13 and extends toward the forward portion of the reel (Fig. 1). A cam face 66 is disposed on each side of the cam finger 65. The cam face 66 is adapted to engage the bail 51 when the bail is moved out of line-engaging position at the time when the highest part of the curved portion is adjacent the base. Under these conditions, the position of the bail is automatically turned 180 degrees to a line-engaging position when the crank 43 is turned and the bail 51 is brought into contact with the cam finger 65. During this automatic turning of the bail it rides out of groove 54 and is thereby expanded. The resiliency of the wire tends to compress the ends of the bail together, with the result that the end portions automatically ride along the inclined faces of caps 52 until they reach the shoulders to the left of holes 53 (in Figure 2), at which time bail 51 will be in line-engaging position.

A modification of the slip clutch is shown in Fig. 11 of the drawings. In this modification, the spool is rigid and cannot rotate in any manner. The slippage is provided in this construction between the crank and the drive gear. A sleeve 40 is provided on the pin 44 in the same manner as disclosed in Fig. 2. However, a fabric or fiber disc 67 is provided on the body of the main drive gear 35, and a fiber washer 67a is placed between the flange on the end of the sleeve 40 and the drive gear 35. Also, an external screw-threaded portion 68 is provided on the sleeve 40. Adjacent the screw-threaded portion 68 is a spring disc 69 which is provided with the lug-forming extension 70, and the guide 71, which is disposed in the slot 72 in the sleeve 40. Communicating with the extension 70 is a nut 73, which is disposed on the screw-threaded portion 68 of the sleeve 40. It will be seen that as the nut 73 is screwed toward the main drive gear 35, the engagement between the spring disc 69 and the fabric or fiber disc 67 is increased to prevent slippage. As the nut 73 is backed off, increased slippage of the crank relative to the main drive gear will be permitted. Axial travel of the disc 69 is guided by the guide 71 in the slot 72. Thus, a pull on the fishing line greater than the amount of brake or drag, causes the crank to slip and allows relative movement between the spool and the crank. This is the preferred form of slip clutch mechanism, since it prevents any rotation of the spool member. It has been found that even slight amounts of rotation of the spool can cause line tangles or snarls and this, of course, is completely eliminated where there is no rotation of the spool permitted. The handle 43 has a boss 74 formed thereon which is screw-threaded on to the sleeve 40. A set screw 75 is provided in the boss and extends into the slot 72 in the tightened position to hold the boss 74 in place.

In use, the reel post 13 is attached to a fishing rod. The bail 51 is moved to the inoperative position as shown in phantom, Fig. 3. The lure is then cast out and the line is whirled or spun about an axis, which is generally coincident with the axis of the stationary spool 56. Due to the centrifugal forces acting on the line, the orbit described by the spinning line is larger than the circumference of the end cap 60 of the stationary spool. As in all spinning type reels, resistance to the release of the line and flight of the lure is very low, thus permitting relatively longer casts than is possible under the same conditions with conventional types of reels in which the line spool rotates. Since there are no rotating parts set in motion by the line during the cast, backlashes and tangles in the line are reduced so that a more perfect control over the line is maintained at all times than is possible with conventional types of rotating spool reels.

When it is desired to retrieve the lure, the crank 43 is rotated to effect rotation of the flier 25, and reciprocation of the shaft 22. When the flier 25 is rotated, the bail 51 is forced along the cam face 66 of the cam finger 65 (Fig. 3) and is flipped over in a 180 degree arc to the solid line position. During this operation, the bail 51 passes over the front spool cap 60 and, thus, guides the line into one of the corners of the bail. As the crank 43 is further rotated, the flier and line-engaging bail are rotated about the spool. The main shaft 22, which is affixed to the core 58 of the spool, is simultaneously reciprocated to provide a uniform winding of the line across the length of the spool.

The reel of the present invention is particularly characterized by its simplicity and the ready interchangeability of its parts to form a reel which is adapted for either left hand or right hand operation. Referring to Fig. 2, all that is necessary to change the operation is to unscrew the pin 44, and remove the stamping 12, the gear-crank unit 39, and plate 31. The cap screw 47 and stamping 11 are removed from the other side of the spacer 17. The parts are then assembled on reverse sides of the spacer 17. The stamping 11 is placed on the reverse side of the spacer 17 and the cap screw 47 is placed in the transverse hole 20 in the spacer 17. The cam follower 29 (Fig. 10) is rotated 180 degrees, and the plate 31, gear-crank unit 39, stamping 12, and pin 44 are assembled on the other side of the spacer 17 in that order. The reel is then ready for right hand winding as shown in Fig. 4.

Figure 12:
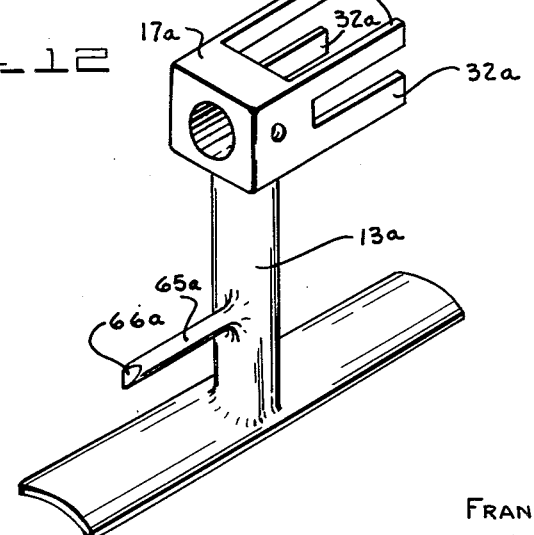
Fig. 12 is a perspective view of a modification of the reel post of the present invention wherein the entire construction is die cast as a single unitary piece.

Another embodiment of the reel post construction is shown in Fig. 12 of the drawings. This modification is cheaper, since the entire construction can be die cast as a single integral unit. The reel post 13a is similar in configuration to the reel post 13 shown in Fig. 1 of the drawings. However, the spacer 17a is cast as an integral part of the post 13a. In addition, two plates 31a are formed rearwardly of the spacer 17a, one extending adjacent each side thereof. These plates are provided with grooves 32a in the same manner as the plate 31, shown in Fig. 1. However, the provision of two plates as an integral portion of the die cast reel post permits changing from left hand operation to right hand operation or vice versa without the necessity of removing a plate 31a. A plate 31a is provided on each side of the unit so that if it is necessary to change the parts as previously described, it can be accomplished without removing a plate.

The brake or slip clutch of Fig. 1 or the one shown in Fig. 11 may be used. As previously disclosed, the construction of Fig. 11 is preferred wherein the crank is permitted to slip relative to the main drive gear when an excessive pull is exerted on the fishing line.

Having thus described my invention, I claim:

1. In a casting reel, a line-carrying spool fixed to a reciprocating spindle, a rotatable flier surrounding said spool and having a semi-circular line guiding wire bail pivotally and removably mounted thereon, an operating crank, driving means operatively connected with said crank, spindle, and flier to effect the simultaneous reciprocation of said spindle and rotation of said flier upon actuation of said crank, a reel support adapted for attachment to a fishing rod and adapted to seat said spindle and said driving means, and a cam finger having a cam surface thereon extending from said reel support to engage said wire bail when it is out of line-engaging position as the said crank is turned and flip the said bail over the end of the spool to automatically engage the line for winding on the spool, the wire bail having both ends bent at an angle to the plane of said bail and then turned toward each other on a line parallel to the plane of said bail to provide line-engaging portions when rotating in either a clockwise or counterclockwise direction, a pair of raised portions on said flier, each raised portion having an opening, a groove, a shoulder and a cam face leading from said groove around said opening to said shoulder at an acute angle to the periphery of the flier, the turned portions of said bail being pivotally mounted in said openings and the angularly bent portions being received in said grooves when said bail is in alignment with said cam finger, whereby when the bail engages the cam finger said angularly bent portions will ride out of said groove, along said cam face and into engagement with said shoulder, whereupon said bail will be in line-engaging position.

2. In a spinning type casting reel, a unitary reel support comprising an arm and a head portion formed thereon, said head portion having symmetrical sides and having a transverse screw-threaded hole on each side and a longitudinal hole through the central portion thereof, and including a pair of parallel plates, each being slotted longitudinally in a direction parallel to the axis of the longitudinal hole, a reciprocating spindle disposed through the longitudinal hole in said head portion having a line-carrying spool on one end thereof and a cam follower on the other end thereof which extends through one of said longitudinal slots, and a crank-drive gear assembly disposed on one side of said head portion and including a main drive gear, a friction pad disposed on the side of said main drive gear, a sleeve extending through the center of said main drive gear and flanged on one end to retain said main drive gear in position, a screw-threaded portion provided on the outside of said sleeve and spaced from said flange, a pressure disc disposed over said sleeve and adapted to engage said friction pad, a lug extending substantially parallel to the axis of said sleeve and a nut disposed over said sleeve to engage said lug and move said disc along said sleeve as the nut is adjusted.

3. A casting reel comprising; a support; a spindle slidably mounted on said support; a non-rotatable line-carrying spool immovably mounted on one end of said spindle; a pin projecting from said support; a drive gear encircling said pin but free to rotate with respect thereto; a stop member abutting one face of said drive gear; a friction disk abutting the other face of said drive gear; an externally threaded sleeve rotatably mounted on said pin; a nut threaded on said sleeve for varying the frictional force between said friction disk and said drive gear; a crank immovably mounted on said sleeve; and means between said drive gear and said spindle for causing said spindle to reciprocate in a straight line when said drive gear is rotating.

4. In a casting reel, a line-carrying spool fixed to a reciprocable spindle, a rotatable flier surrounding said spool and having a semi-circular line guiding bail pivotally mounted thereon, an operating crank and driving means to effect the simultaneous reciprocation of said spindle and rotation of said flier upon actuation of said crank, a reel support adapted for attachment to a fishing rod and seating said crank and said driving means, and a cam finger extending from said support to engage said bail when it is out of line-engaging position as the crank is turned and flip said bail over the end of the spool, the bail having at least one of its end portions bent at an angle to the plane of said bail, the extreme ends of the bail being turned toward each other on a line parallel to the plane of said bail, a pair of raised portions on said flier, each of said raised portions having an opening and having a groove, a shoulder and a cam face leading from said groove around said opening to said shoulder at an acute angle to the periphery of the flier, the turned portions of said bail being pivotally mounted in said openings and bail portions adjacent said turned portions being received in said grooves when said bail is in alignment with said cam finger, whereby when the bail engages the cam finger said adjacent bail portions will ride out of said groove along said cam face and into engagement with said shoulder, whereupon said bail will be in line-engaging position.

References Cited in the file of this patent

UNITED STATES PATENTS

| Number | Name | Date |
|---|---|---|
| 814,342 | Atha | Mar. 6, 1906 |
| 1,051,277 | Self | Jan. 21, 1913 |
| 1,053,871 | Purdom | Feb. 18, 1913 |

(Other references on following page)

UNITED STATES PATENTS

| | | |
|---|---|---|
| 1,184,849 | Gysel | May 30, 1916 |
| 1,187,840 | Illingworth | June 20, 1916 |
| 2,197,779 | Coxe | Apr. 23, 1940 |
| 2,229,470 | Pezon | Jan. 21, 1941 |
| 2,354,530 | McMahon | July 25, 1944 |
| 2,360,488 | Garman | Oct. 17, 1944 |
| 2,498,987 | Duncan | Feb. 28, 1950 |
| 2,500,445 | Worden | Mar. 4, 1950 |
| 2,546,465 | Martini | Mar. 27, 1951 |

FOREIGN PATENTS

| | | |
|---|---|---|
| 22,701 | Great Britain | of 1912 |
| 383,438 | Great Britain | Nov. 17, 1932 |
| 402,080 | Great Britain | Nov. 20, 1933 |
| 473,239 | Great Britain | Oct. 8, 1937 |
| 496,163 | Great Britain | Nov. 25, 1938 |
| 838,978 | France | Dec. 16, 1938 |
| 919,747 | France | Dec. 9, 1946 |
| 930,541 | France | Aug. 11, 1947 |
| 430,257 | Italy | Feb. 12, 1948 |
| 252,487 | Switzerland | Mar. 16, 1949 |